(No Model.)
M. REICHERT.
VEGETABLE SLICER.
No. 298,623. Patented May 13, 1884.
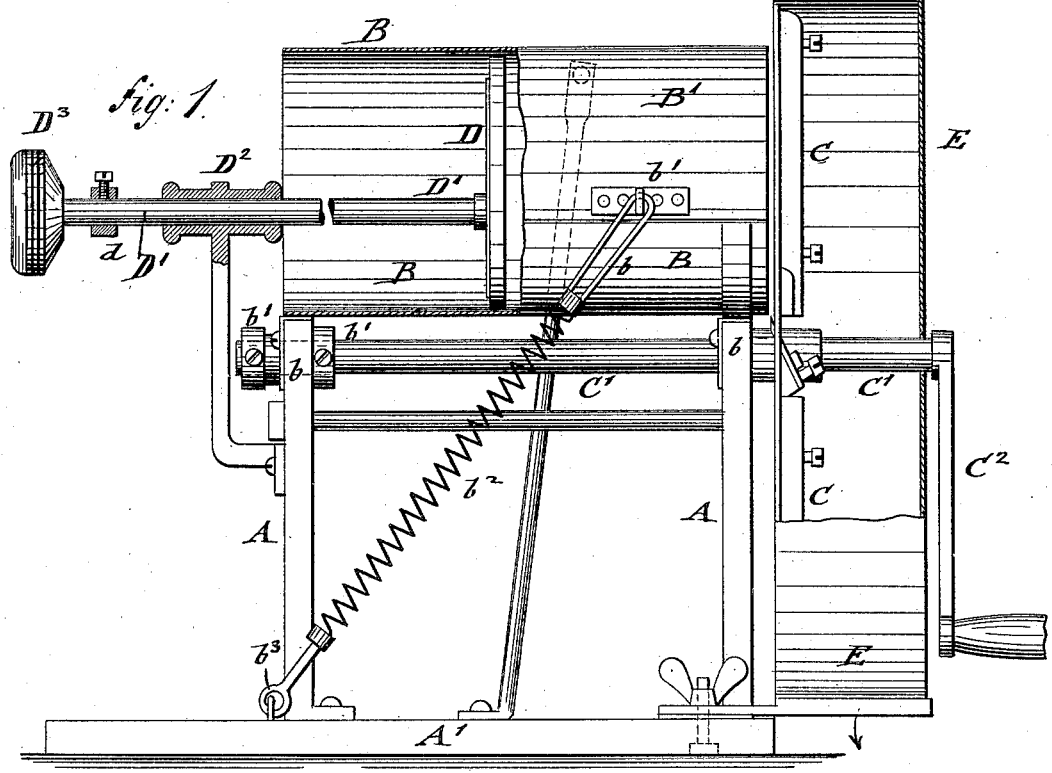
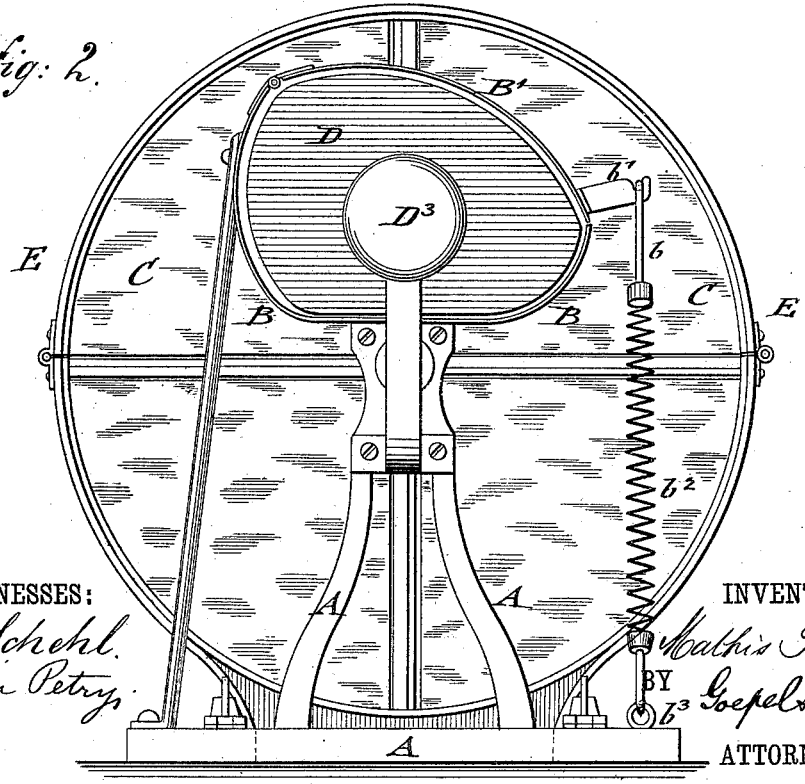
WITNESSES:
A. Schehl.
Martin Petry.
INVENTOR
Mathis Reichert
BY Goepel & Raymer
ATTORNEYS.

UNITED STATES PATENT OFFICE.

MATHIAS REICHERT, OF NEW YORK, N. Y.

VEGETABLE-SLICER.

SPECIFICATION forming part of Letters Patent No. 298,623, dated May 13, 1884.

Application filed February 9, 1884. (No model.)

*To all whom it may concern:*

Be it known that I, MATHIAS REICHERT, of the city, county, and State of New York, have invented certain new and useful Improvements in Vegetable-Slicers, of which the following is a specification.

This invention has reference to an improved machine for slicing potatoes, beets, cabbage, and other vegetables in a quick and convenient manner; and the invention consists of a horizontal shell having a hinged cover, a rotary cutter-disk, the shaft of which is supported in bearings below the shell, said disk being provided with radial cutting-knives and a follower, which is fitted to the interior of the shell and guided in a sleeve of the supporting-frame, as will more fully appear hereinafter, and finally be pointed out in the claim.

In the accompanying drawings, Figure 1 represents a side elevation, with parts broken away, of my improved vegetable-slicer; and Fig. 2 is an end elevation of the same.

Similar letters of reference indicate corresponding parts.

A A in the drawings represent the supporting-standards of my improved vegetable-slicing machine, which are attached to a table or other stationary base-support, A'. On the fork-shaped arms of the standards A is supported a horizontal guide-shell, B, having a hinged lid, B', which lid is secured in closed position by a slotted link, $b$, to a fixed hook, $b'$, of the shell, the link $b$ being applied by a spiral spring, $b^2$, to a fixed eye, $b^3$, of the base A'. In place of the locking mechanism described, any other suitable fastening device may be used for keeping the lid of the shell in closed position. The guide-shell B is open at both ends, and serves to guide the potatoes or other vegetables that are to be sliced forward toward the revolving cutter-disk C. The slow forward feeding of the vegetable is accomplished by a follower, D, the shank D' of which is guided in a horizontal sleeve, $D^2$, attached to the rear standard, A. A handle, $D^3$, at the outer end of the shank D' serves for moving the follower forward until an adjustable collar, $d$, on the shank D' abuts against the horizontal side sleeve, $D^2$, as shown in Fig. 1. This stop-collar $d$ prevents the follower D from getting too close to the cutter-disk C. The disk C is attached by a central hub to the shaft C', which is supported below the guide-shell B in bearings $b\ b$ of the standards A A. The disk C is retained in position close to the end of the guide-shell B by stop-collars $b'$, that are arranged at opposite sides of the bearing $b$ of the rear standard, A, as shown in Fig. 1. The disk C is provided with radial cutting-knives, which are arranged in inclined cheeks of the disk, and which project in the usual manner through slots of the same, so as to exert a cutting action upon the vegetables that are pressed by the follower D into the path of the edges of the cutting-knives.

To the outer end of the shaft C' is applied a detachable crank-handle, $C^2$, by which the cutting-disk C is revolved.

The revolving disk C is inclosed by a guard casing or hood, E, which is detachably secured to the front standards, A, and the base part A', said hood being open at the bottom part and at that side toward the disk C, so that the sliced vegetables are conducted into a vessel placed below the bottom opening of the hood. The hood E is preferably made in two parts, the upper part being hinged to the lower part, so as to admit the ready cleaning of the hood. In this manner the slicer can be worked rapidly without causing any slices to fly about, they being conducted by the hopper-shaped lower part of the hood into the receiver. By unscrewing the crank-handle $C^2$ and detaching the hood the cutter-disk and its knives can be conveniently cleaned.

The machine is adapted for use in hotels, restaurants, and other places where vegetables of all kinds have to be sliced in large quantities.

Having thus described my invention, I claim as new and desire to secure by Letters Patent—

The combination of a horizontal guide-shell having a hinged lid and means for fastening the lid, a horizontally-guided follower, a rotating cutter-disk arranged at one end of the guide-shell, the horizontal shaft of which is supported in bearings below the guide-shell, a crank-handle, secured detachably to the outer end of the shaft, and a guard frame or hood extending around the cutter-disk, and being detachably connected to the supporting-frame of the machine, substantially as and for the purpose set forth.

In testimony that I claim the foregoing as my invention I have signed my name in the presence of two subscribing witnesses.

MATHIAS REICHERT.

Witnesses:
PAUL GOEPEL,
SIDNEY MANN.